(12) United States Patent
Weisenburger

(10) Patent No.: US 6,533,132 B1
(45) Date of Patent: Mar. 18, 2003

(54) PORTABLE FISHING ROD RACK

(76) Inventor: Richard T. Weisenburger, Ccent, 790 SE. 5$^{th}$ Ter., Crystal River, FL (US) 34429

( * ) Notice: Subject to any disclaimer, the term of this patent is extended or adjusted under 35 U.S.C. 154(b) by 0 days.

(21) Appl. No.: 09/952,068

(22) Filed: Sep. 14, 2001

(51) Int. Cl.$^7$ ................................................. A47F 5/00
(52) U.S. Cl. ....................... 211/70.8; 211/118; 248/340
(58) Field of Search ................................ 211/119, 118, 211/117, 113, 70.8; 248/339, 340

(56) References Cited

U.S. PATENT DOCUMENTS

| | | | | |
|---|---|---|---|---|
| 1,611,397 A | * | 12/1926 | Wells | |
| 1,873,039 A | * | 8/1932 | Robinson et al. | |
| 2,580,625 A | * | 1/1952 | Waltz | 211/70.8 X |
| 3,536,286 A | * | 10/1970 | Kramer | |
| 4,034,865 A | * | 7/1977 | Batts et al. | 211/118 |
| 4,071,146 A | * | 1/1978 | Batts | 211/118 X |
| 4,454,905 A | * | 6/1984 | Banko | |
| 6,123,238 A | * | 9/2000 | Dumplet | 211/113 X |

\* cited by examiner

*Primary Examiner*—Robert W. Gibson, Jr.
(74) *Attorney, Agent, or Firm*—Martin Fleit; Paul D. Bianco; Fleit Kain Gibbons Gutman & Bongini P.L.

(57) ABSTRACT

A portable rack is provided to store one or more fishing rods. A group of elongated modular elements are strung end-to-end to form two associated, vertical, horizontally spaced columns. Each modular element is an integrally molded plastic bar having at its top an integrally molded member and at its bottom an integrally molded construction that includes a hook opening upwardly. The integrally molded construction at the bottom of each modular element forms a quickly attachable and detachable coupling with the integrally molded member at the top of the next succeeding lower modular element. Horizontally aligned hooks support fishing rods. An attachment on each column mounts the vertical column on a mounting structure.

13 Claims, 5 Drawing Sheets

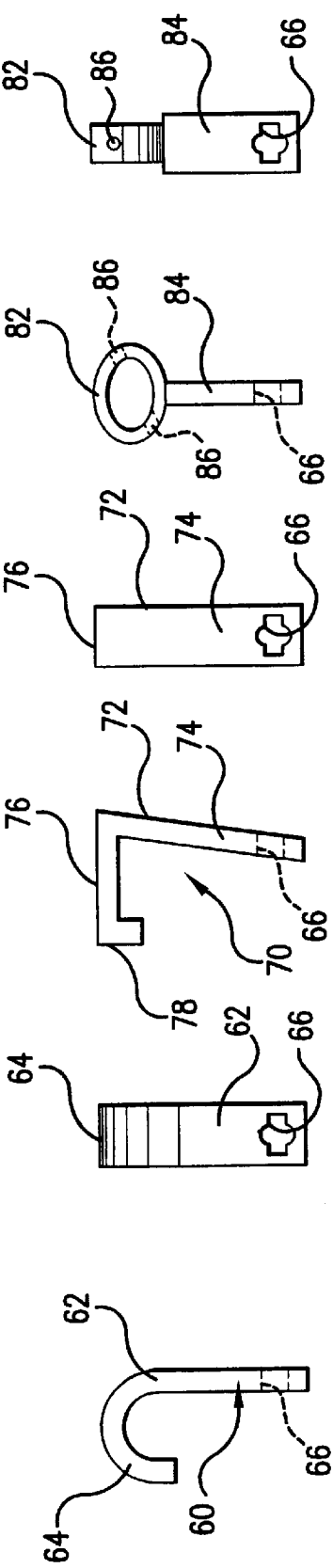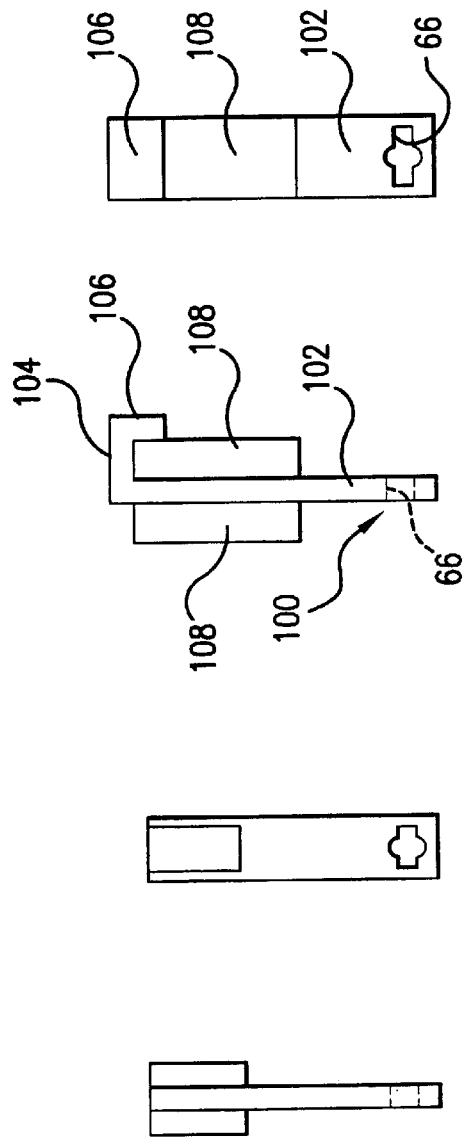

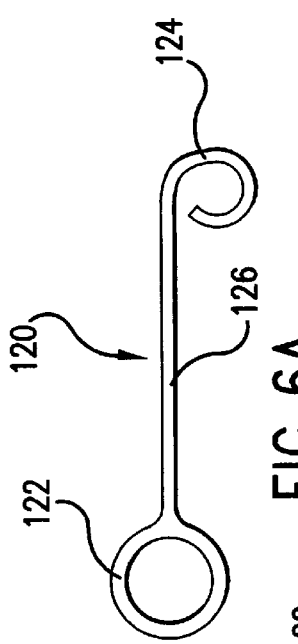
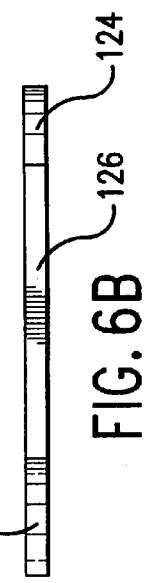
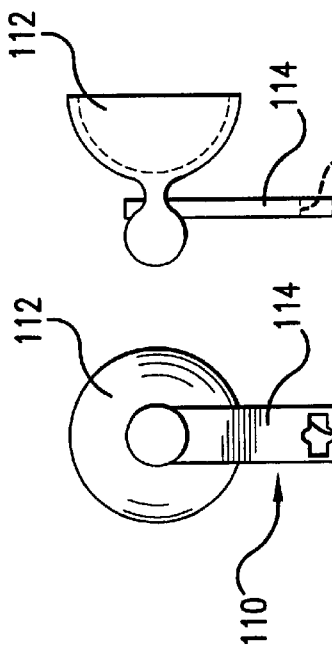
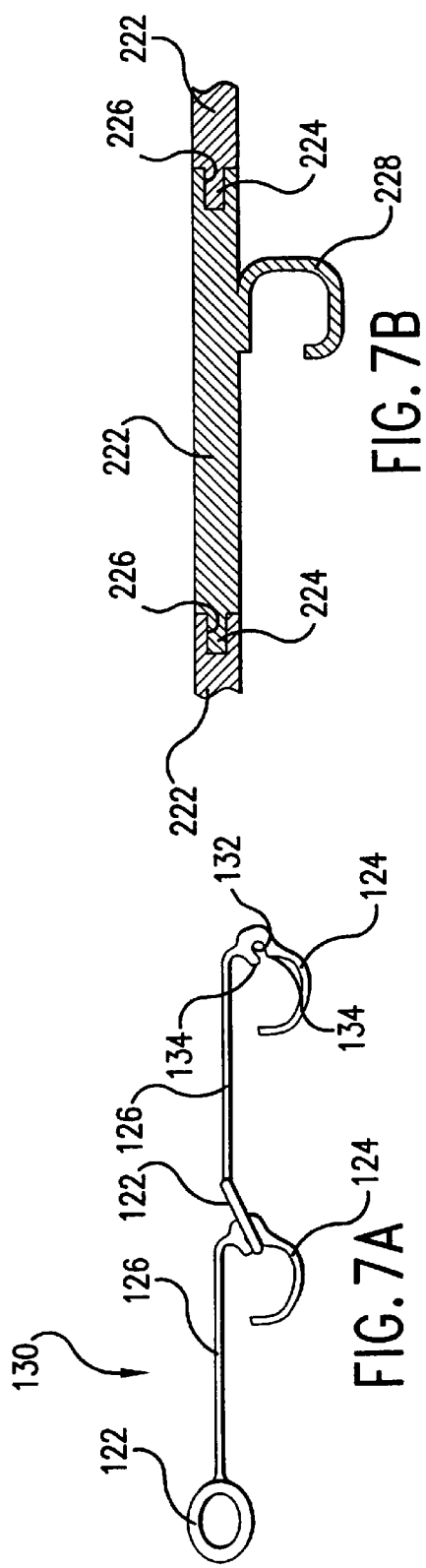

PORTABLE FISHING ROD RACK

BACKGROUND OF THE INVENTION

1. Field of the Invention

The present invention relates to a portable fishing rack that can be taken on trips to protect fishing rods, reels and other items used by a fisherman during a fishing trip.

2. Prior Art

Whereas various equipment is available for use by a fisherman during a fishing trip, nevertheless, no one has provided a portable fishing rod rack that can be temporarily set up for holding fishing rods and reels to protect them from damage.

SUMMARY OF THE INVENTION

It is a principal object of the present invention to provide a portable fishing rod rack that can be transported in a disassembled condition and easily erected to store rods and reels during a trip.

The foregoing is accomplished by the provision of a uniquely designed modular element together with specially designed attachments. The rack is assembled from the modular elements and mounted to any convenient wall, door, shower curtain rod or other curtain rod, or a window utilizing the specially designed attachments.

The present invention enables a fisherman to travel with several fishing rods and reels without fear of damage, and to have ready access to cleaning or drying of the equipment. The equipment is maintained in an organized fashion and is readily accessible for rigging. The present invention provides protection from breakage and damage while allowing easy access to and readiness of rods. The present invention provides a way to hang the fishing rods in an out-of-the-way manner while permitting them to dry and be stored.

As noted above, the present invention accomplishes the foregoing objectives by the utilization of a modular element that enables erection of a rack in an inexpensive and easy manner. The installation of the rack can be effected using walls of a hotel or motel, sliding doors, curtain rods, walls, trees, clotheslines, or any available line or surface that provides the requisite area for hanging the rack. The modular element is constructed of a hard plastic material that renders it non-corrosive and easy to clean. The modular element enables the rack to be erected to any given rod requirement and to be readily expanded as needed. Also, since the rack is constructed from a modular element, it can be broken down and stored in a relatively small space. Further since it is made from any suitable hard plastic material, it can be packed as regular luggage and will pass readily through an airport security scanner without causing any difficulty.

Describing the present invention more particularly, a portable rack is provided for storing one or more fishing rods comprising a plurality of first elongated modular elements capable of being strung into two associated vertical columns horizontally spaced apart, each said first modular element being composed of an integrally molded plastic bar having at its top an integrally molded member and at its bottom an integrally molded construction that includes a hook opening upwardly, the said plurality of first modular elements being constructed and arranged when strung together end-to-end so that the integrally molded construction at the bottom of each first modular element coacts with the integrally molded member at the top of the next succeeding lower first modular element to form a quickly attachable and detachable coupling, and the upward opening hooks of the first modular elements of one column being generally horizontally aligned with the upward opening hooks of the associated spaced column of first modular elements for supporting fishing rods therebetween, and an attachment for coacting with the vertically topmost first modular element of each column to mount the vertical column on a mounting structure with the vertical column of first modular elements depending therefrom.

In one embodiment, the portable rack, made as set forth above, has a hook that is bifurcated. Also, the integrally molded member noted above can include one of a key and keyhole opening. Further, the integrally molded member can include a cross bar, and the cross bar can have a cross section of one of square, round and polygonal. The integrally molded construction of the portable rack described above can include one of a key and keyhole opening.

The attachment of the portable rack, as described above, can include a plastic bar having a hook at its top end and a complementary structure at its bottom end that coacts with the integrally molded member at the top end of the first modular element.

The attachment can be a plastic bar that is provided with a construction at its top end for mounting on a vertical surface. The construction can be one of a ring, a suction cup and a adhesive element.

The portable rack, as described above, can further comprise a horizontal traverse between a pair of hooks located on the two vertical columns. Other and further advantages of the present invention will become apparent from the following detailed description of the invention when taken with the appended drawings.

BRIEF DESCRIPTION OF THE DRAWINGS

FIGS. 5A to 5L show various specially designed attachments for use with the modular elements depicted in of FIGS. 2–4 to mount the rack to a supporting structure.

FIGS. 6a and 6b show in side elevation and top plan, respectively, a hook, a number of which may be strung upon a horizontal traverse to hold various items.

FIGS. 7A and 7B show embodiments of second modular elements with two such second modular elements strung together serially and held with a snap fit.

DETAILED DESCRIPTION OF PREFERRED EMBODIMENTS OF THE INVENTION

Figure 1:
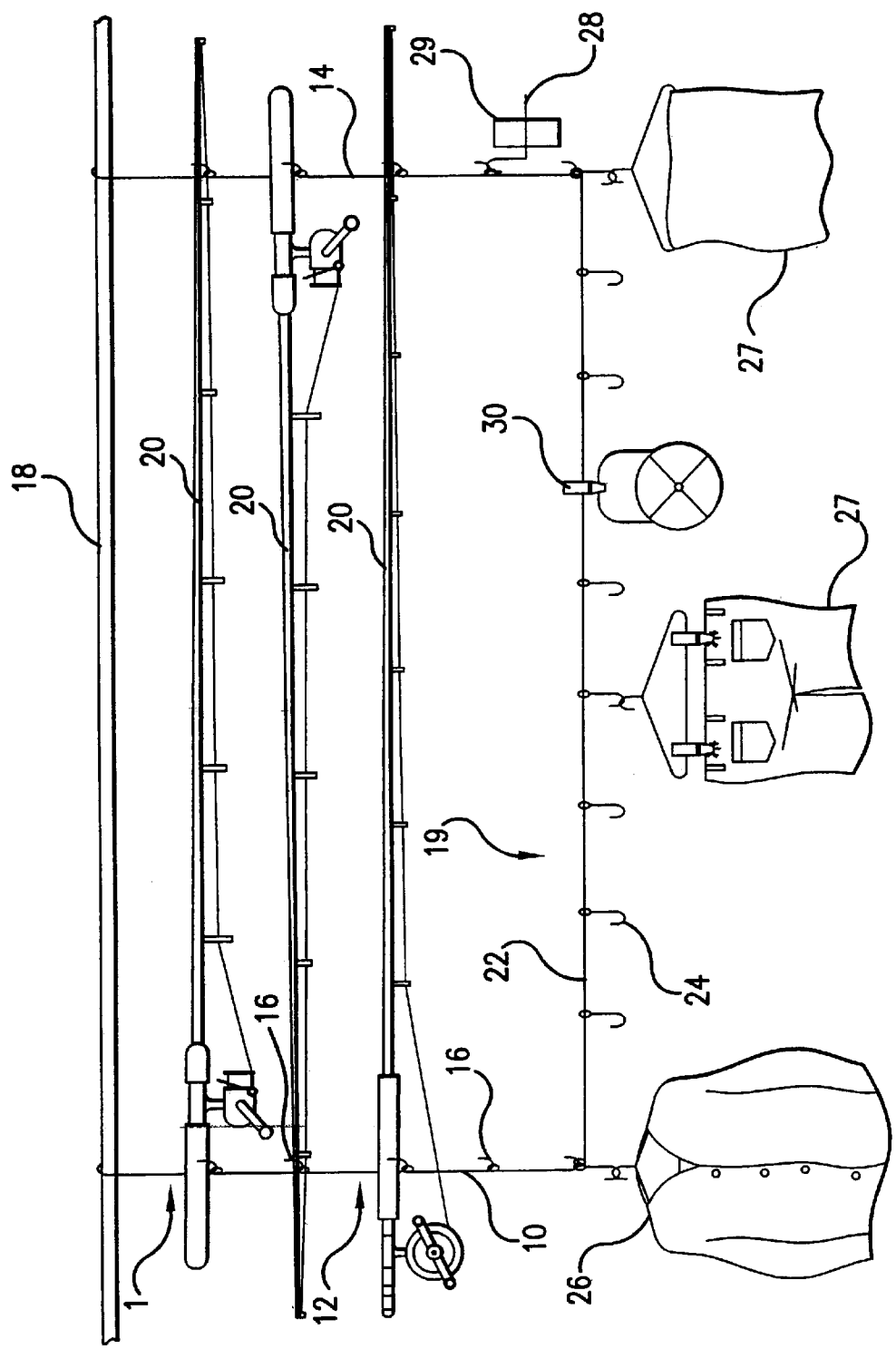
FIG. 1 shows diagrammatically the rack of the present invention erected from two distinct modular elements and specially designed attachments, and mounted from a curtain rod; the various components of the rack are shown schematically.

Referring now to the drawings, detailed preferred embodiments of the invention will be described. Referring initially to FIG. 1, there is shown the inventive rack consisting of a series of first modular elements 10 which have been linked together in series in two vertically spaced columns designated generally as 12 and 14. The first modular elements each present a hook 16 and a specially designed attachment 15, to be described in detail hereinafter, mounts the two columns 12 and 14 to a curtain rod 18. Suspended between the two columns 12 and 14 of first modular elements 10 are several fishing rods designated generally as 20, the rods 20 being supported by the hooks 16. Providing a horizontal traverse, generally designated as 19, between the lowest hooks 16 of columns 12 and 14, for example, is a series of second modular elements 22 strung together in series in a manner that will be explained in more detail in the following description. The second modular elements 22 each present a hook 24 from which a variety of items can be suspended and supported. As shown, a hanger 26 can be supported from the lowest hook 16, or alternatively, from any hook 24. Also, other items, such as shirts, hats, towels or the like, can be supported by the hooks 24 or hooks 16 directly or through the intermediary of hangers 26, baskets 27, etc. Specially designed attachments 28 can be supported by the hooks 16 to function as line spoolers for reels 29 as shown at the right side of FIG. 1.

Figure 2:
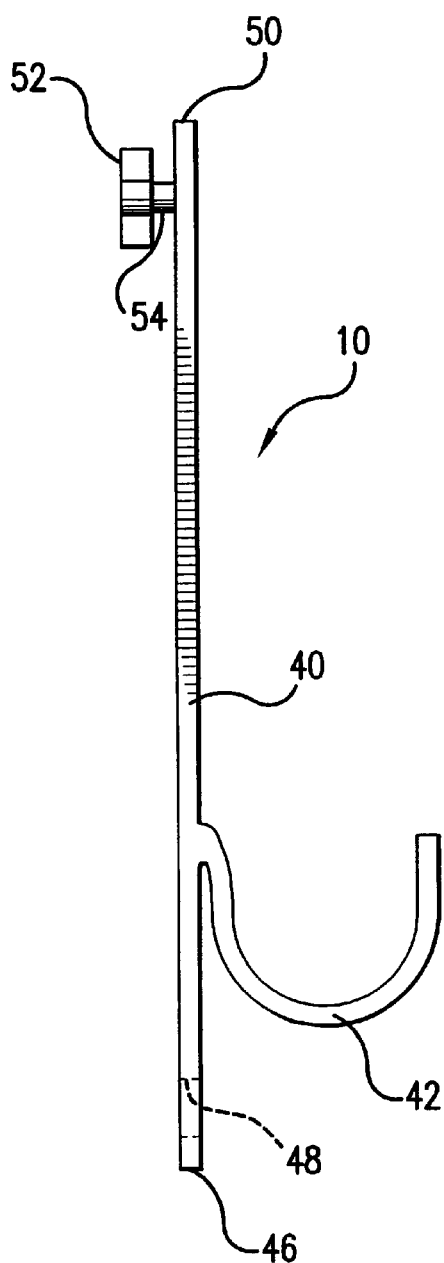
FIG. 2 shows in side elevation a first modular element of the rack.
Figure 3:
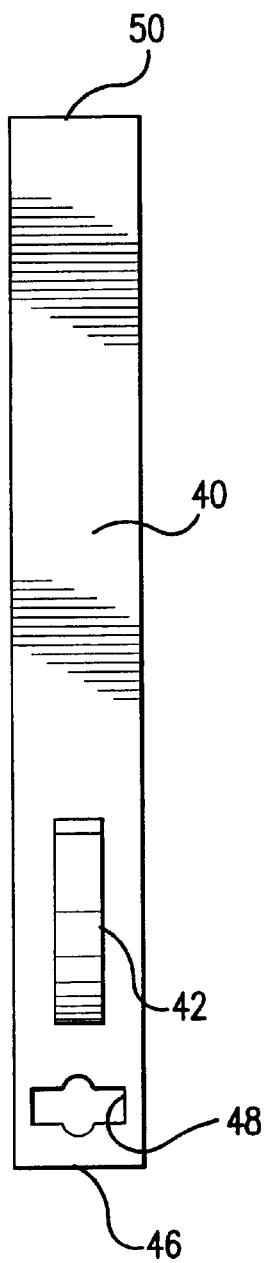
FIG. 3 shows in front elevation the first modular element of FIG. 2.
Figure 4:
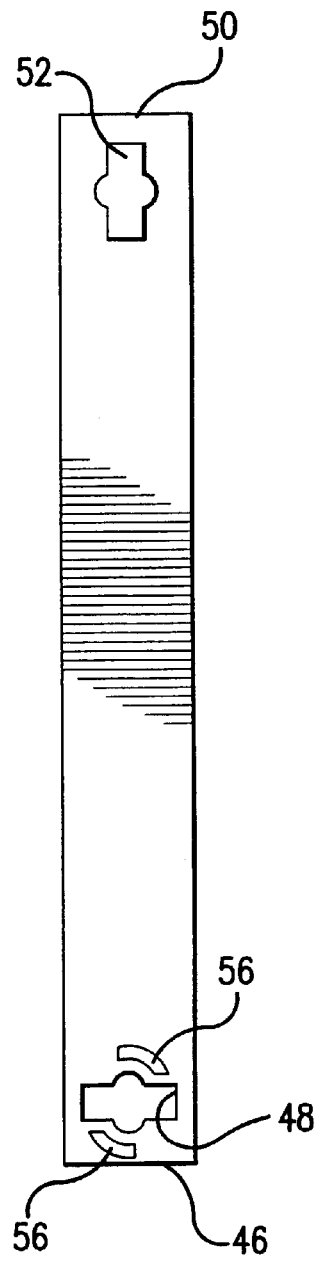
FIG. 4 shows in rear elevation the first modular element of FIG. 2.

Referring now to FIGS. 2–4, the first modular element 10 comprises a flat hard plastic elongated bar or plate 40. Any suitable non-corrosive, durable, easily cleanable plastic material can be used for this purpose. A hook 42, corresponding to hook 16 in FIG. 1 is integrally formed or molded from the bar 40 on its front side. The bottom end 46 of the bar 40 is provided with an integrally formed elongated centrally enlarged keyhole opening 48 that extends through the bar 40 from front to back. The orientation of the keyhole opening 48 is shown as horizontal. The top end 50 of the bar 40 is provided on it back side with an integrally molded elongate key 52 that projects normally away from the bar 40 and is complementary in cross sectional shape to the keyhole opening 48, except that its orientation is vertical. A short shaft 54, integrally formed during the molding of the key 52, holds the key 52 spaced from bar 40 a distance equal to or slightly greater than the thickness of bar 40.

In order to string a series of first modular elements into a column, the key 52 projecting on the backside at the top end 50 of bar 40 of each next succeeding, vertically placed first modular element is inserted through the keyhole 48 at the bottom end 46 of the first modular element next preceding it vertically. A modification of the coupling between adjacent bars 40 can be enhanced by molding the keyhole openings 48 such that ramps 56 are formed on the back surface of bar 40 to cooperate with the elongated ends of the key 52 to cam the key into a good friction fit with the back of the bar 40 to provide a tighter coupling, if desired. Alternatively, the key undersurface, that is, the surface nearest the back surface of the bar 40, can be molded at an angle to serve the same function as the ramps. The orientation of the keyhole 48 and key 52 can be reversed. Further, the orientation of one of the key or keyhole can be 45 degrees with a vertical or horizontal orientation of the other of the keyhole or key.

The columns 12 and 14 are mounted to a supporting structure in spaced relation, as depicted in FIG. 1. the supporting structure may be any convenient vertical structure as a wall, door, window, and the like, or a rod such as a curtain or drapery rod. Specially designed fittings or attachments cooperate with the columns 12 and 14 of first modular elements 10 are employed to mount the columns to a supporting structure. Such specially designed attachments are shown in FIGS. 5a to 5l. As shown, FIGS. 5a and 5b show an attachment 60 suitable for mounting the columns 12 and 14 to a rod or the like and comprises a short plastic bar 62 having an integrally formed hook 64 at the top and a keyhole opening 66 at its lower end for cooperating with the key 52 at the top 50 of the topmost first modular element 10 of a column 12 or 14. As explained previously, the mating of the attachment to the topmost first modular element 10 is accomplished by positioning the attachment 60 horizontally in order to align the key 52 and keyhole opening 66. Thereupon the keyhole opening 66 is inserted over the key 52 and then rotated 90 degrees to a vertical orientation with hook 64 at the top.

FIGS. 5c and 5d show an attachment 70 that can be conveniently mounted on a door or the like, and comprises an integrally molded plastic bar 72 of inverted L-shape with the bottom end of the depending leg 74 having a keyhole opening 66. The top leg 76 extends in a straight line terminating in a short depending lip or skirt 78.

FIGS. 5e and 5f show an attachment integrally molded out of plastic that can be fastened to a supporting structure like a door or wall, and comprises a loop 82 with an elongated bar 84 extending radially downward. Bar 84 at its lower end defines a keyhole opening 66, and the loop 82 is provided with diametrical openings 86 on an inclined diameter to receive a nail or screw (not shown) at an acute angle to a supporting surface to effect attachment to the supporting surface.

FIGS. 5g and 5h show an attachment 90 that comprises a bar 92 of plastic that has adhered thereto on opposite sides pads 94 of double sided tape. The lower end of bar 92 is provided with a keyhole opening 66. Attachment 90 is suitable to mount the columns 12 and 14 to a vertical surface by adhesion.

FIGS. 5i and 5j show an attachment 100 that is suitable for attachment to a vertical surface by adhesion, and comprises a molded plastic bar 102 defining a top cap 104 having a terminal depending lip 106 The bar 102 is provided with double sided adhesive pads 108 that facilitate the attachment to a vertical surface.

FIGS. 5k and 5l show an attachment 110 that is suitable for attachment to a surface by suction, and comprises a suction cup 112, on which is suspended a plastic bar 114 having a keyhole opening 66 at its lower end.

FIGS. 6a and 6b show a hook 24 that may be strung upon a horizontal element, as shown in FIG. 1.

FIG. 7a shows a second modular element . As shown, two elements 130 are coupled via the loop 122 of one snap fit into the hook 124 of the other. In this manner, the horizontal traverse can be reinforced for a more positive stringing. The snap fit is accomplished using a modified inner portion of the hook 124 so that a recess 132 is molded into the inner surface of hook 124, and is provided with a narrowed entrance 134. Because the material of the hook 124 is plastic that has a good degree of flexibility, the ring or loop 122 can be forced past the entrance into the recess 132 where it is held in a positive manner. The ring or loop 122 can be disassembled from the hook 124 by simply forcing the loop 122 out of the recess 132 past the narrow entrance 134. Also, the exterior of the hook 124 is reinforced; this portion is thicker, as shown at 136.

FIG. 7b shows another embodiment of a second modular element for assembling a horizontal traverse 22. Here, rather than a ring, there is a first fitting portion 224 for snap-fitting into a second fitting portion 226 near the hook of the next second modular element, allowing the elements to be strung together to form the horizontal traverse.

Figures 8A, 8B:
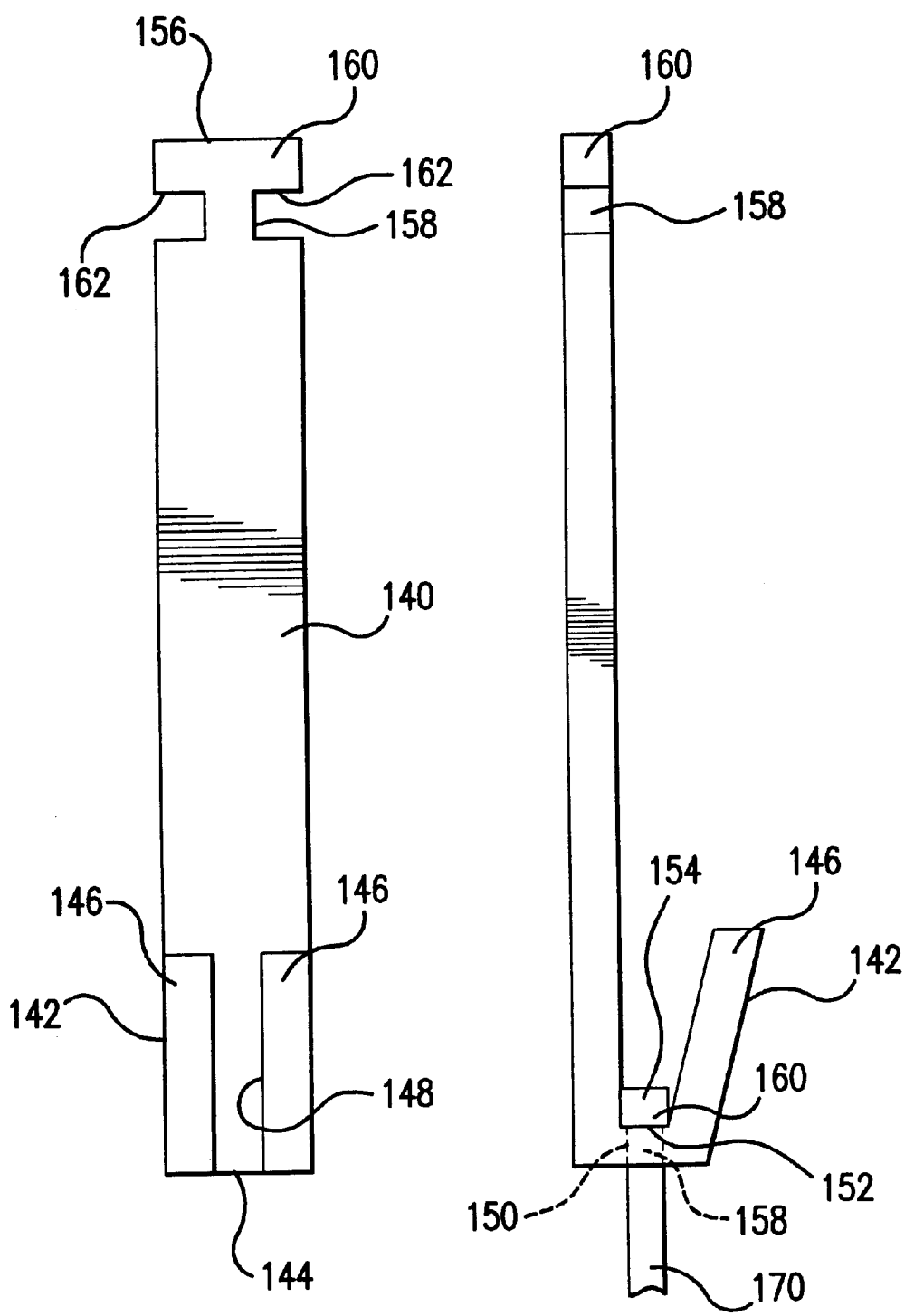
FIGS. 8a and 8b show a modified first modular element used for the assembly of an embodiment of the inventive rack.

A modification of the first modular element is shown in FIGS. 8a and 8b, and comprises a molded plastic bar 140 having an integrally molded bifurcated hook 142 formed at its lower end 144. The free end of the prongs 146 that define the hook 142 are spaced uniformly with the slot 148 between the prongs 146 extending to the bottom of the hook 142 and terminating adjacent to the lower end of the bar 140 as shown and designated at 150. The bottom 152 of the hook presents a flat surface 154. The top end 156 of bar 140 is formed with a stub 158 of lesser cross section than the bar 140 that is integrally molded with a cross bar or rod 160 which is shown as the same cross section and configuration as t he bar 140. Two such modified modular elements are mated or coupled by inserting the cross bar 160 into the hook 142 with the stub 158 situated or received in the slot 148 defined between the prongs 146 of hook 142. The shoulders 162 of cross bar 160 rest on and are supported on the flat surfaces 154. Whereas the cross bar 160 is shown as rectangular in cross section, it may be circular or any polygonal configuration, and hook 142 can be curved to any complementary configuration. FIG. 8b shows the next succeeding lower first modular element 170 coupled or mated to the next preceding higher first modular element 140, in the manner described above. It will be appreciated that the specially designed attachments shown and described with respect to FIG. 5 will be appropriately modified to defined lower bifurcated hooks suitable for cooperating with the top construction of the modified first modular element as described.

Although the invention has been shown and described in terms of specific preferred embodiments, it will be appreciated by those skilled in the art that modifications and changes are possible without departing from the spirit, scope and teachings of the invention. Such changes and modifications as are obvious to one skilled in the art are deemed to fall within the purview of the invention as claimed.

What is claimed is:

1. A portable rack for storing one or more fishing rods comprising:

a plurality of first elongated modular elements for stringing into at least two associated vertical columns horizontally spaced apart;

each said first modular element comprising an integrally molded plastic bar having at its top an integrally molded member and at its bottom an integrally molded construction that includes a hook opening upwardly;

the said plurality of first modular elements being constructed and arranged when strung together end-to-end so that the integrally molded construction at the bottom of each first modular element co-acts with the integrally molded member at the top of the next succeeding lower first modular element to form a quickly attachable and detachable coupling;

the upward opening hooks of the first modular elements of one column being generally horizontally aligned with the upward opening hooks of the associated spaced column of first modular elements for supporting fishing rods therebetween; and an attachment for co-acting with the vertically topmost first modular element of each column to mount the vertical column on a mounting structure with the vertical column of first modular elements depending therefrom.

2. The portable rack according to claim 1 wherein the hook is bifurcated.

3. The portable rack according to claim 1 wherein the integrally molded member includes one of a key and keyhole opening.

4. The portable rack according to claim 1 wherein the integrally molded member includes a cross bar.

5. The portable rack according to claim 4 wherein the cross bar has a cross section of one of square, round and polygonal.

6. The portable rack according to claim 1 wherein the integrally molded construction includes one of a key and keyhole opening.

7. The portable rack according to claim 1 wherein the attachment is a plastic bar having a hook at its top end and a complementary structure at its bottom end that coacts with the integrally molded member at the top end of the first modular element.

8. The portable rack according to claim 1 wherein the attachment is a plastic bar that is provided with a construction for mounting on a vertical surface.

9. The portable rack according to claim 8 wherein the construction is one of a ring, a suction cup and an adhesive element.

10. The portable rack according to claim 1 further including a plurality of second modular elements constructed and arranged to be fitted together end-to-end to establish a horizontal traverse between a pair of hooks located on the two vertical columns.

11. The portable rack according to claim 10 wherein each second modular element comprises an elongated plastic shank terminating on one end with a ring and at its other end with a hook.

12. The portable rack according to claim 11 wherein the hook of each second modular element is provided with a flexible recess into which the ring of a next succeeding second modular element can be snap fit.

13. The portable rack according to claim 1 further comprising a rigid horizontal traverse.

\* \* \* \* \*